United States Patent
Kikuchi

(10) Patent No.: US 12,438,875 B2
(45) Date of Patent: Oct. 7, 2025

(54) SERVER APPARATUS, ONLINE LEARNING SYSTEM, PROGRAM, AND STORAGE MEDIUM

(71) Applicant: AKAmedia Japan Inc., Tokyo (JP)

(72) Inventor: Mairu Kikuchi, Tokyo (JP)

(73) Assignee: AKAmedia Japan Inc., Tokyo (JP)

(*) Notice: Subject to any disclaimer, the term of this patent is extended or adjusted under 35 U.S.C. 154(b) by 0 days.

(21) Appl. No.: 18/575,641

(22) PCT Filed: Jun. 3, 2022

(86) PCT No.: PCT/JP2022/022587
§ 371 (c)(1),
(2) Date: Dec. 29, 2023

(87) PCT Pub. No.: WO2023/276548
PCT Pub. Date: Jan. 5, 2023

(65) Prior Publication Data
US 2024/0267375 A1    Aug. 8, 2024

(30) Foreign Application Priority Data

Jul. 2, 2021  (JP) .............................. 2021-110841
Jul. 9, 2021  (JP) .............................. 2021-114586

(51) Int. Cl.
*H04L 29/06*  (2006.01)
*H04L 9/40*  (2022.01)

(52) U.S. Cl.
CPC ...... *H04L 63/0861* (2013.01); *H04L 63/0823* (2013.01)

(58) Field of Classification Search
CPC ..................... H04L 63/0823; H04L 63/0861
See application file for complete search history.

(56) References Cited

U.S. PATENT DOCUMENTS 10,909,354 B2 *  2/2021  Negi ................... G06V 40/172
11,488,250 B2 *  11/2022  Conradie ........... G06Q 30/0185
(Continued)

FOREIGN PATENT DOCUMENTS

JP   2009-276950 A   11/2009
JP       6887710 B1   6/2021
(Continued)

OTHER PUBLICATIONS

Jasmine Valera et al., A Review on Facial Recognition for Online Learning Authentication, Mar. 14, 2016, IEEE, pp. 16-19. (Year: 2016).*
(Continued)

*Primary Examiner* — Luu T Pham
*Assistant Examiner* — Fahimeh Mohammadi
(74) *Attorney, Agent, or Firm* — Keating & Bennett, LLP

(57) ABSTRACT

A server apparatus includes: a registration data storage unit that stores user registration data corresponding to information written in an official certificate; a temporary data storage unit that temporarily stores official certificate data; and a verification processing unit that verifies the user registration data stored in the registration data storage unit against the official certificate data stored in the temporary data storage unit, wherein the temporary data storage unit does not retain the official certificate data used in the verification, after the verification in the verification processing unit.

3 Claims, 25 Drawing Sheets

(56) References Cited

U.S. PATENT DOCUMENTS

| | | | | |
|---|---|---|---|---|
| 11,948,398 | B2* | 4/2024 | Hayase | G06Q 20/40145 |
| 2005/0246344 | A1* | 11/2005 | Keller | H04L 51/212 |
| 2016/0065558 | A1* | 3/2016 | Suresh | G06F 21/32 |
| | | | | 726/7 |
| 2017/0323152 | A1* | 11/2017 | Negi | G09B 5/062 |
| 2018/0181737 | A1* | 6/2018 | Tussy | G06F 21/32 |
| 2018/0285629 | A1* | 10/2018 | Son | G06V 10/809 |
| 2019/0042866 | A1* | 2/2019 | Mostafa | G06V 40/171 |
| 2019/0057249 | A1* | 2/2019 | Hayase | G06V 40/161 |
| 2019/0197220 | A1* | 6/2019 | Anderson | G09B 7/00 |
| 2020/0089904 | A1* | 3/2020 | Lin | G06F 16/972 |
| 2020/0410074 | A1 | 12/2020 | Dang et al. | |
| 2022/0083697 | A1* | 3/2022 | Shoji | G06F 21/31 |
| 2022/0207946 | A1* | 6/2022 | Voss | G07C 9/00571 |
| 2022/0329588 | A1* | 10/2022 | Szigeti | H04L 63/107 |
| 2023/0252905 | A1* | 8/2023 | Kikuchi | G09B 5/02 |

FOREIGN PATENT DOCUMENTS

| | | |
|---|---|---|
| JP | 6892950 B1 | 6/2021 |
| KR | 20100075357 A | 7/2010 |
| KR | 20200118842 A | 10/2020 |

OTHER PUBLICATIONS

Assad Moini et al., Leveraging Biometrics for User Authentication in Online Learning: A Systems Perspective, Dec. 2009, IEEE, vol. 3, Issue: 4, pp. 469-476. (Year: 2009).*

Fabien Cardinaux et al., User Authentication via Adapted Statistical Models of Face Images, Jan. 2006, IEEE, vol. 54, Issue: 1, pp. 361-373. (Year: 2006).*

Maheen Zulfiqar et al., Deep Face Recognition for Biometric Authentication, Dec. 27, 2019, IEEE, pp. 1-6. (Year: 2019).*

Official Communication issued in International Patent Application No. PCT/JP2022/022587, mailed on Aug. 16, 2022.

Miyata, "Omiai Data Breach Incident. How much damage was done? Why it's not "someone else's problem" for other companies", https://www.itmedia.co.jp/business/articles/2105/24/news049.html, May 24, 2021, 6 pages.

Watanabe, "Rapid facial identification system based on optical correlation", Image Lab, vol. 17 No. 3, Mar. 1, 2006, 8 pages.

* cited by examiner

| Item number | Title |
|---|---|
| 1-1 | Introduction |
| 1-2 | Basic |
| 1-3 | Applied |
| 1-4 | Advanced |

Student registration screen — 41a

| Name of educational institution | ○○○○ Association | 41b |
| Name | Tanaka Oro | 41c |
| Login ID | 1234 | 41f |
| Date of birth | 200X/○/△ | 41g |
| Address | Tokyo○○··· | 41d |
| E-mail address | *@+++.* | 41e |
| Password | gu549gj | |
| Contract plan | △△ | |
| Contract period | 202X/1〜202Y/12 | |

42a — Face photo data for authentication: [Attach file] Data with the .++++ extension can be uploaded
142a — [Photograph with camera] — 142c 42b — Data of face photo-attached official certificate: [Attach file] Data with the .++++ extension can be uploaded
142b — [Photograph with camera] — 142d 43 — [Confirm]

FIG.7A

| Login ID | Data of face photo-attached official certificate |
|---|---|
|  |  |

FIG.11

SERVER APPARATUS, ONLINE LEARNING SYSTEM, PROGRAM, AND STORAGE MEDIUM

TECHNICAL FIELD

The present invention relates to a server apparatus, an online learning system, a program, and a storage medium.

BACKGROUND ART

In recent years, a learning system for allowing a lecture that is being distributed in real time or has been recorded to be learned on-line via the Internet or the like, which is a so-called e-learning, has been used widely. In such online learning, user data (biometric authentication information) are registered in advance in an authentication server in order to prevent someone other than the user from taking the course (spoofing). A system that performs personal authentication (biometric authentication) by verifying biometric authentication information acquired at random timing during a lecture against biometric authentication information registered in the authentication server is disclosed in, for example, JP-A-2009-276950. Incidentally, JP-A-2009-276950 discloses that unique information such as fingerprints, veins, iris, or retina is used as biometric authentication information.

PRIOR ART DOCUMENT

Patent Document
    Patent Document 1: JP-A-2009-276950

SUMMARY OF INVENTION

Problem to be Solved by the Invention

Here, the system disclosed in JP-A-2009-276950 is configured on the premise that the biometric authentication information registered in advance in the authentication server is that of the student him/herself. However, in reality, in order to guarantee that the data registered in advance in the authentication server belong to the student him/herself (the user him/herself), the user may be required to submit a copy of the official certificate. However, when the information on the copy of the official certificate is registered in the authentication server, if the information on the copy of the official certificate is leaked from the authentication server due to human error or unauthorized access from outside, it will cause serious damage to the user.

In view of the above problems, it is an object of the present invention to provide a server apparatus, an online learning system, a program, and a storage medium that can guarantee that registered user data belong to the user him/herself while reducing the risk of leaking of user information.

Means to Solve the Problem

To achieve the above-described object, the server apparatus of the present invention includes:
  a registration data storage unit that stores user registration data corresponding to information written in an official certificate;
  a temporary data storage unit that temporarily stores official certificate data; and
  a verification processing unit that verifies the user registration data stored in the registration data storage unit against the official certificate data stored in the temporary data storage unit,
  wherein the temporary data storage unit does not retain the official certificate data used in the verification, after the verification in the verification processing unit.

Effect of the Invention

With the present invention in which the user registration data are verified against the official certificate data, it is possible to guarantee that the user registration data belong to the user him/herself. The official certificate data used in the verification are not retained after the verification, which makes it possible to prevent leakage of the official certificate data. As a result, it is possible to guarantee that registered user data belong to the user him/herself while reducing the risk of leaking of user information.

BRIEF DESCRIPTION OF DRAWINGS

FIG. 4 illustrates items of online learning materials.
FIG. 7A is a schematic diagram illustrating one example of a student registration screen.
FIG. 11 is a diagram for explaining that data of a face photo-attached official certificate are deleted from the temporary data storage unit.

MODE FOR CARRYING OUT THE INVENTION

Figure 1:
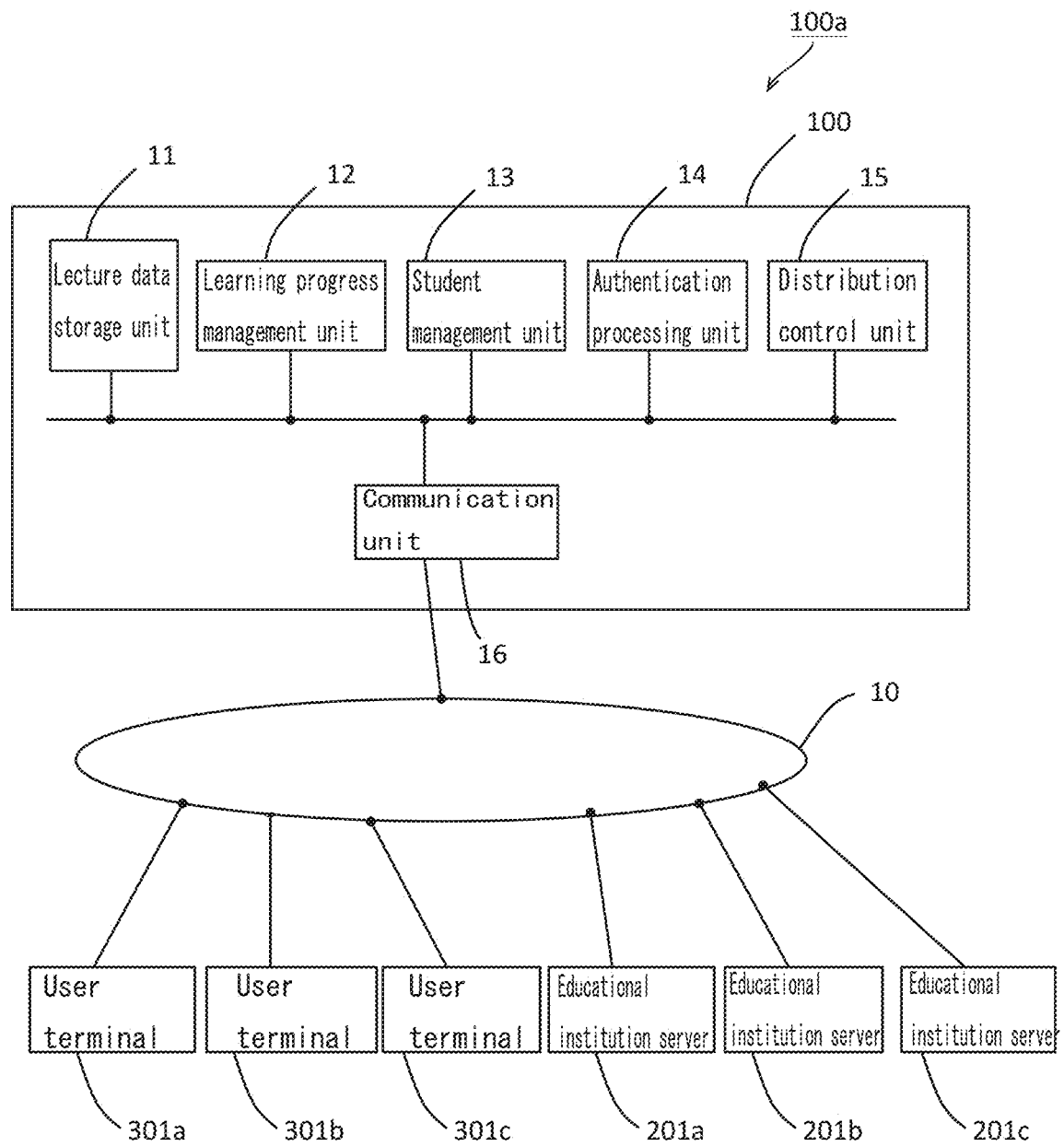
FIG. 1 is a block diagram illustrating a schematic configuration of an online learning system according to a first embodiment of the present invention.

Embodiments of the present invention are described in detail, with reference to the drawings. Identical or equivalent parts in the drawings are denoted by the same reference numerals, and the descriptions of the same are not repeated.

First Embodiment

FIG. 1 is a schematic diagram illustrating a schematic configuration of an online learning system 100a according to the present embodiment. The online learning system 100a includes a distribution device 100 that distributes online learning materials (contents) via the Internet 10. Online learning materials may be distributed in real time or on demand. Furthermore, the online learning materials may be videos or still pictures. Furthermore, the online learning materials may be one-way materials (one-way lectures from the lecturer to the students) or two-way materials. In addition to lecture-style materials, online learning materials also include reading materials and online drills in which students are presented with questions and asked to enter answers for scoring.

Figure 2:
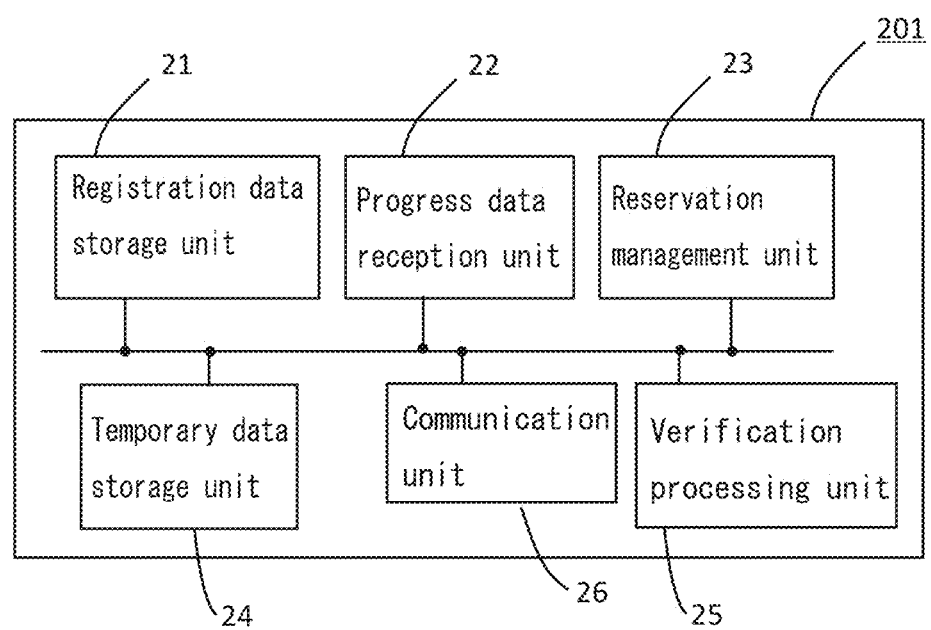
FIG. 2 is a block diagram illustrating a schematic configuration of an educational institution server.
Figure 3:
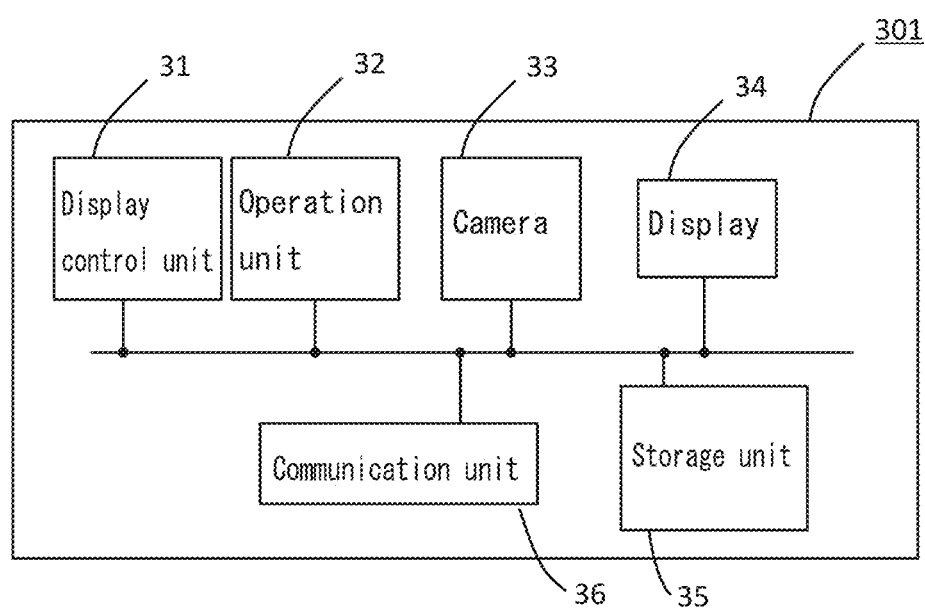
FIG. 3 is a block diagram illustrating a schematic configuration of a user terminal.

As shown in FIG. 1, the online learning system 100a includes educational institution servers 201a, 201b, 201c, . . . connected to the distribution device 100 via the Internet 10. Further, the distribution device 100 is connected to user terminals 301a, 301b, 301c . . . via the Internet 10. In the following description, when it is not necessary to individually distinguish the user terminal from one another, the terminal is referred to simply as the "user terminal 301". Similarly regarding the educational institution server, when it is not necessary to individually distinguish the same from one another, the server is referred to simply as the "educational institution server 201". Incidentally, "users" of the online learning system 100a include not only users (students) who study using the online learning system 100a, but also lecturers, employees, and administrators of educational institutions who provide education using the online learning system 100a. That is, the user terminal 301 is a terminal used by these "users". Users of the online learning system 100a register at the educational institution server 201. FIG. 2 is a block diagram illustrating a configuration of the educational institution server 201. FIG. 3 is a block diagram illustrating a configuration of the user terminal 301. As the user terminal 301, an arbitrary terminal can be used as long as it is a terminal that can be connected to the Internet 10 such as a personal computer, a tablet, or a smartphone and that can use a Web browser. The educational institution server 201 is a server of an educational institution that conducts lectures that require strict attendance management (for example, statutory courses, qualification or credit certification courses, etc.). "Educational institutions" encompass, but are not limited to, schools, driving schools, qualification certification bodies, etc.

A configuration and operations of the distribution device 100 are described below. As illustrated in FIG. 1, the distribution device 100 includes a lecture data storage unit 11, a learning progress management unit 12, a student management unit 13, an authentication processing unit 14, a distribution control unit 15, and a communication unit 16. The lecture data storage unit 11 is realized as a storage device such as a hard disk. The learning progress management unit 12, the student management unit 13, the authentication processing unit 14, the distribution control unit 15, and the communication unit 16 are realized by a server or a processor of a computer. Incidentally, each of these units may be realized by one computer and its peripheral devices, or may be realized by multiple computers and peripheral devices.

The lecture data storage unit 11 stores online learning materials. FIG. 4 is a diagram showing exemplary items of online learning materials stored in the lecture data storage unit 11. For example, after taking "Introduction" with item number 1-1, students take "Basic" with item number 1-2, "Applied" with item number 1-3, and "Advanced" with item number 1-4 in this order.

The learning progress management unit 12 stores a learning history of each student (which items of online learning materials the student has finished learning). The learning progress management unit 12 further cooperates with the authentication processing unit 14 in management regarding to what extent the student has watched a lecture video during the reproduction of the lecture video. In addition, when a lecture by a lecturer (lecture video), instead of a lecture video stored in advance in the lecture data storage unit 11, is distributed in real time, the learning progress management unit 12 cooperates with the authentication processing unit 14 in management regarding to what extent the student has watched a lecture video during the distribution of the lecture video. In addition, when image data of materials or question and answer data (data from online drills, etc.) are distributed to students, the learning progress management unit 12 cooperates with the authentication processing unit 14 in management regarding to what extent the student has watched the material, during the distribution of image data of materials or question and answer data (while lecture videos, image data of materials, or question and answer data are being displayed on the user terminal 301).

The student management unit 13 manages the student's login operation and the like. The authentication processing unit 14 performs identity verification of the student and confirms progress during the distribution of the online learning material. The distribution control unit 15 controls the distribution of the lecture video. The communication unit 16 communicates with user terminal 301 and the educational institution server 201 via the Internet 10.

The educational institution server 201 is a server that manages students and lecturers at each educational institution. The educational institution server 201 may be provided at each educational institution, or may be provided as a cloud server that is accessible from each educational institution. As shown in FIG. 2, the educational institution server 201 includes a registration data storage unit 21, a progress data reception unit 22, a reservation management unit 23, a temporary data storage unit 24, a verification processing unit 25, and a communication unit 26.

Figure 5:
FIG. 5 illustrates one example of user registration data stored in a registration data storage unit.

FIG. 5 illustrates one example of user registration data stored in the registration data storage unit 21. User registration data are entered from the user terminal 301 by a student or lecturer using the online learning system 100a, and are stored in the registration data storage unit 21. For example, as shown in FIG. 5, the registration data storage unit 21 stores name (surname and first name), address, date of birth (not shown), and face photo data for authentication as user registration data. In addition to the above data, the registration data storage unit 21 may also store, as user registration data, information on each student attending the educational institution (for example, telephone number (not shown), e-mail address (not shown), progress data (not shown) indicating learning progress, grades, etc.). In addition to information on each student, information on lecturers who give lectures at the educational institution and administrators who manage the educational institution server 201 are stored in the registration data storage unit 21. Incidentally, the user registration data in the present embodiment and subsequent embodiments include data that corresponds to the information written in an official certificate (data that can prove the identity of the user using the official certificate) in order to prevent impersonation, etc. That is, the user registration data include at least part of the name, address, date of birth, face image, etc. written in the official certificate. Then, as described later, when user registration is performed, the user registration data entered by the user is verified against the data in the official certificate.

Furthermore, as shown in FIG. 5, for a student who applies to use the online learning materials, a login ID and password for using the online learning materials are issued, and information of these is also stored in the registration data storage unit 21. Additionally, a login ID and password required for making access to the educational institution server 201 are issued to the lecturer or administrator, and information of these is also stored in the registration data storage unit 21.

Figure 7B:
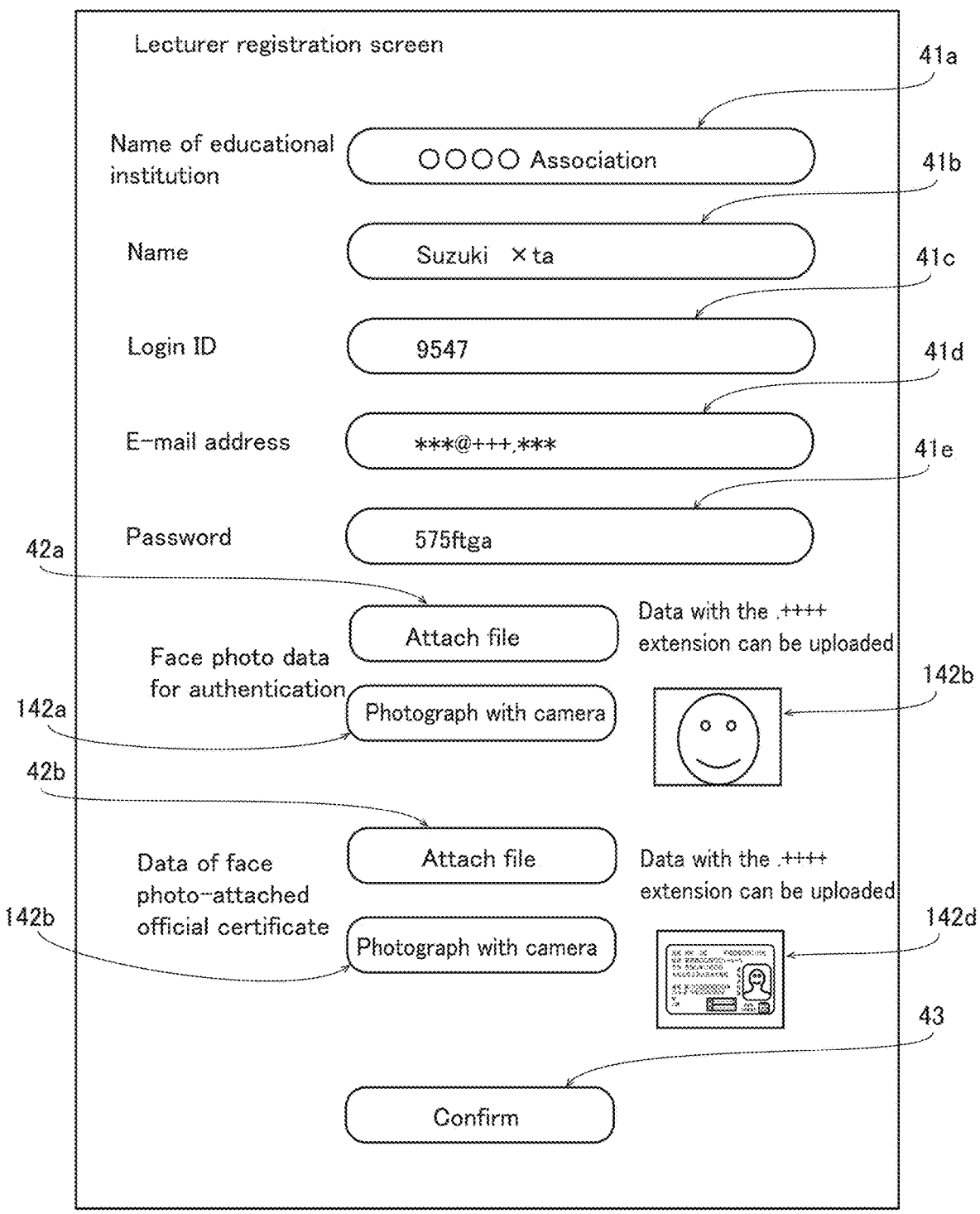
FIG. 7B is a schematic diagram illustrating one example of a lecturer registration screen.

Furthermore, in order to receive distributed online learning materials, it is necessary to register the user's face photo data for authentication (data of face image) in order to perform identity verification during distribution. In the present embodiment, the lecturer's or administrator's face photo data (data of face image) for authentication are registered for identity verification of the lecturer or administrator when he/she makes access to the educational institution server 201. The face photo data for authentication may be uploaded from the user terminal 301 as shown in FIGS. 7A and 7B and described later, or may be a face image of a student, lecturer, or administrator photographed at an educational institution. Further, the face photo data for authentication are not limited to the face image itself, but may be data of characteristics for authentication extracted from the face image. The face photo data for authentication are stored in the registration data storage unit 21.

Every time when a student completes an online learning material (contents), the progress data reception unit 22 receives information of the same, and manages the same as progress data. The reservation management unit 23 manages reservations from students for online lectures conducted by lecturers in real time, and reservations from students for lectures conducted face-to-face between lecturers and students at educational institutions.

Figure 6:
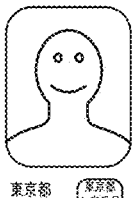
FIG. 6 illustrates one example of data of a face photo-attached official certificate stored in a temporary data storage unit.

FIG. 6 illustrates one example of data of a face photo-attached official certificate temporarily stored in a temporary data storage unit 24. The temporary data storage unit 24 temporarily stores data of a face photo-attached official certificate. In the temporary data storage unit 24, the data of a face photo-attached official certificate are temporarily stored in association with at least part of the user registration data (for example, login ID). Here, a "face photo-attached official certificate" is a certificate with a face photo issued by an official institution, which identifies the person's identity and status, or proves legal qualifications. As the face photo-attached official certificate in the present embodiment, a certificate such as a My Number card, a driver's license, a residence card, or a passport can be used, though examples of the same are not limited to these.

The verification processing unit 25 shown in FIG. 2 verifies user registration data stored in the registration data storage unit 21 against data of a face photo-attached official certificate stored in the temporary data storage unit 24. Processing related to verification will be described later with reference to FIGS. 9 and 10. The communication unit 26 controls communication with the user terminal 301 and the distribution device 100.

FIG. 3 is a block diagram illustrating a configuration of the user terminal 301. As illustrated in FIG. 3, the user terminal 301 includes a display control unit 31, an operation unit 32, a camera 33, a display 34, a storage unit 35, and a communication unit 36. The display control unit 31 is realized by, for example, a Web browser. The operation unit 32 is realized by, for example, a touch panel provided integrally with the display 34 or the like, and accepts an entry from a student. The camera 33 is a camera built in the user terminal 301, and as a so-called in-camera, it is configured to be capable of photographing an image of a student in a state in which the student is viewing the display 34. The communication unit 36 controls communication between the distribution device 100 and the educational institution server 201. The storage unit 35 stores face photo data (face photo data for authentication) of the user photographed by the camera 33 and data of a face photo-attached official certificate, the certificate being converted by the user into the data.

FIG. 7A is a diagram showing an example of a student registration screen. FIG. 7B is a diagram showing an example of a lecturer registration screen. The student registration screen, the lecturer registration screen, and each screen described below are displayed on the display 34 of the user terminal 301, for example. In FIGS. 7A and 7B, an entirety of the screen is illustrated, but it is not necessary that the entirety of this screen should be displayed completely in the display screen of the user terminal 301. For example, on a smartphone or the like, the entirety of this screen may be viewed by scrolling the screen.

As shown in FIGS. 7A and 7B, entry fields 41a to 41e, a button 42a for uploading face photo data for authentication, a button 42b for uploading data of a face photo-attached official certificate, and a confirmation button 43 for confirming entered contents are displayed in the student registration screen and the lecturer registration screen. In the entry field 41a, the name of the educational institution with which the student has a contract or to which the lecturer belongs is entered by the student or the lecturer. In the entry field 41b, the name (surname and first name) of the student or the lecturer is entered by the student or the lecturer. In the entry field 41c, the e-mail address of the student or the lecturer is entered by the student or the lecturer. In the entry field 41d, the password of the student or the lecturer is entered by the student or the lecturer. Furthermore, an entry field 41*f* for the student to enter the date of birth, an entry field 41*g* for the address, an entry field for the student to enter the contract plan between the student and the educational institution, an entry field for the student to enter the contract period of the contract plan may be also displayed in the student registration screen.

When students, lecturers, etc. register as users, it is necessary to upload face photo data for authentication and data of a face photo-attached official certificate from the user terminal 301 to the educational institution server 201. Therefore, the user uses the camera 33 of the user terminal 301 to photograph his or her own face. The photographed image is stored in the storage unit 35. Note that instead of photographing the face at the time of user registration, it is also possible to use an image that has been photographed in advance and stored in the storage unit 35. Similarly, when the user photographs a face photo-attached official certificate using the camera 33, the photographed image is stored in the storage unit 35. In case of photographing the official certificate in advance instead of photographing the official certificate at the time of user registration, it is possible to use the image that has been stored in the storage unit 35. When the button 42*a* is operated, the face photo data for authentication stored in the storage unit 35 of the user terminal 301 are uploaded to the educational institution server 201. When the button 42*b* is operated, the data of a face photo-attached official certificate stored in the storage unit 35 of the user terminal 301 are uploaded to the educational institution server 201 and temporarily stored in the temporary data storage unit 24.

Furthermore, as shown in FIGS. 7A and 7B, the following are displayed in the student registration screen and the lecturer registration screen: a button 142*a* for photographing the user's face for use as face photo data for authentication: a button 142*b* for photographing the user's face photo-attached official certificate; a display 142*c* for confirming the photographed face photo data for authentication; and a display 142*d* for confirming the photographed data of the face photo-attached official certificate. When the button 142*a* or 142*b* is operated (touched) by the user, the camera 33 of the user terminal 301 is automatically activated. Although not shown, when the camera 33 is activated, a screen may be displayed to ask the user for permission to activate the camera 33.

Figure 8A:
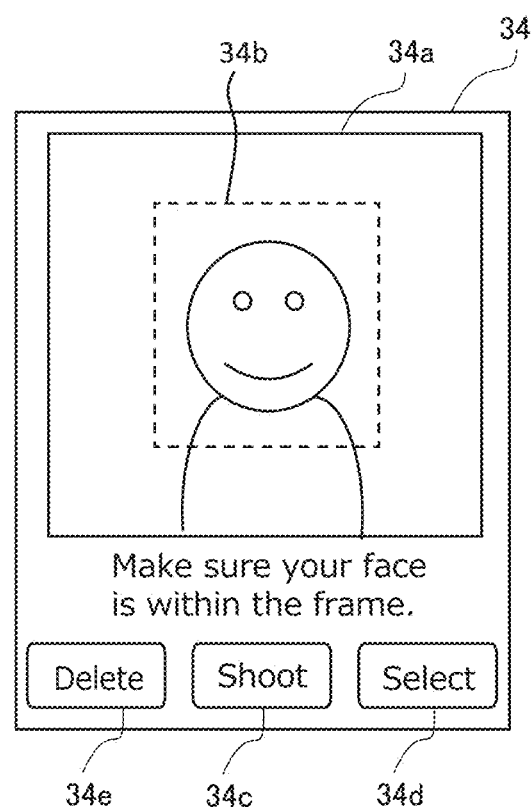
FIG. 8A is a schematic diagram illustrating one example of acquiring face photo data for authentication using a camera
Figure 8B:
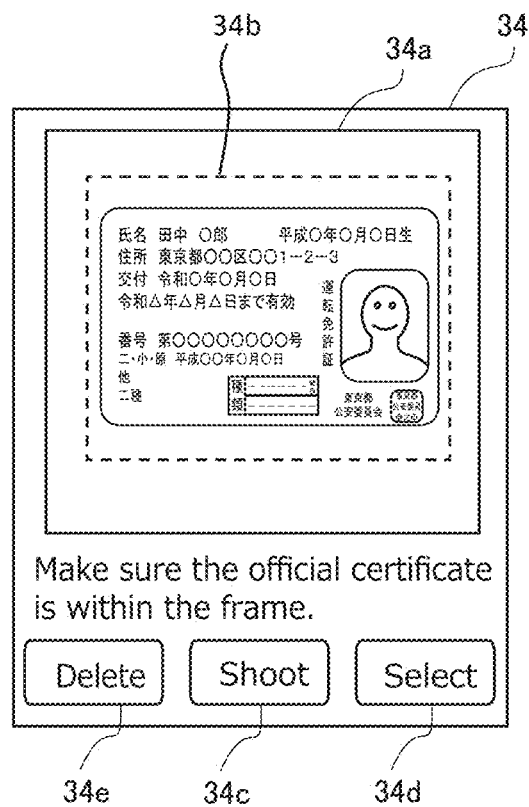
FIG. 8B is a schematic diagram illustrating one example of acquiring face photo data for authentication using a camera

FIG. 8A is a schematic diagram showing an example of acquiring face photo data for authentication using the camera 33, and is a diagram of the screen after the button 142*a* is operated. FIG. 8B is a schematic diagram showing an example of acquiring data of a face photo-attached official certificate using the camera 33, and is a diagram of the screen after the button 142*b* is operated. As shown in FIGS. 8A and 8B, an image display section 34*a* for an image photographed by the camera 33, a guide frame 34*b*, a shooting button 34*c*, a select button 34*d*, and a deletion button 34*e* are displayed in the display 34 of the user terminal 301.

First, when the button 142*a* or 142*b* is operated by the user, the image currently being captured by the camera 33 is displayed in the image display section 34*a*. Then, when the shooting button 34*c* is operated by the user, an image photographed at the timing when the shooting button 34*c* was operated is temporarily retained (captured) in the memory as image data. Then, when the shooting button 34*c* is operated, the captured image (still picture) is displayed in the image display section 34*a*. Then, when the deletion button 34*e* is operated, the captured image data are erased. Thereafter, the image currently being captured by the camera 33 is displayed in the image display section 34*a*. Further, the guide frame 34*b* is a guide display for photographing the face and official certificate at appropriate dimensions. The shape of the guide frame 34*b* is set to be suitable for photographing a face and photographing an official certificate, as shown in FIGS. 8A and 8B, respectively.

And when the select button 34*d* is operated by the user, the screen displayed on the user terminal 301 returns to the screen shown in FIG. 7A or 7B, and the captured image is displayed on either corresponding one of the display 142*c* for confirming the photographed face photo data for authentication and the display 142*d* for confirming the photographed data of the face photo-attached official certificate. If the user wants to confirm the displays 142*c* and 142*d*, and wants to perform the photographing again, the image can be re-photographed by operating the button 142*a* or 142*b* again.

Then, when the confirmation button 43 is operated, the verification processing unit 25 extracts the face image or the data of characteristics of the face from the data of the face photo-attached official certificate. Then, the verification processing unit 25 performs matching (verification) of the face photo data for authentication against the face image or the data of characteristics of the face extracted from the data of the face photo-attached official certificate. Then, the verification processing unit 25 extracts character data such as the name, address, and date of birth from the data of the face photo-attached official certificate. Then, the verification processing unit 25 performs matching (verification) between the data entered on the student registration screen or the lecturer registration screen (user registration data) and the character data extracted from the data of the face photo-attached official certificate.

Figure 9:
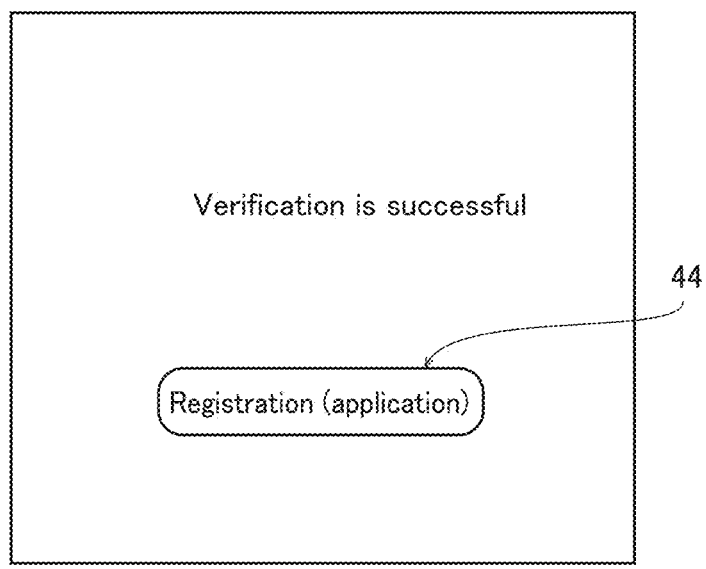
FIG. 9 is a schematic diagram illustrating one example of a screen when the verification was successful.
Figure 10:
FIG. 10 is a schematic diagram illustrating one example of a screen when the verification failed.

If they are found to coincide with each other as a result of matching (if the verification was successful), as shown in FIG. 9, a registration button 44 is displayed on the user terminal 301. The registration button 44 is a button for registering, in the registration data storage unit 21, data (user registration data) other than the data of the face photo-attached official certificate among the data entered on the student registration screen or the lecturer registration screen. When the registration button 44 is operated, the user registration data (see FIG. 5) containing the face photo data for authentication are registered in the registration data storage unit 21. Also, if they are found not to coincide with each other as a result of matching (if the verification failed), as shown in FIG. 10, a message that encourages the re-entry such as "Verification has failed. Please re-enter again", and a button 45 for returning to the student registration screen or the lecturer registration screen, are displayed on the user terminal 301. When the button 45 is operated, the student registration screen or the lecturer registration screen are again displayed. After that, with the student registration screen or the lecturer registration screen being displayed, the user may correct the entered information or re-upload the face photo data for authentication or the data of the face photo-attached official certificate.

FIG. 11 is a diagram for explaining the temporary data storage unit 24 after the verification in the verification processing unit 25. As shown in FIG. 11, in the present embodiment, the temporary data storage unit 24 does not retain the data of the face photo-attached official certificate used for the verification, after the verification in the verification processing unit 25. When the verification in the verification processing unit 25 was successful, the temporary data storage unit 24 deletes the data of the face photo-attached official certificate used for the verification. This means that data of the face photo-attached official certificate are not saved in the educational institution server 201 or the distribution device 100 after the verification is finished. In addition, when the communication with the user terminal 301 is cut or the registration is discontinued for other reasons, the temporary data storage unit 24 also deletes the data of a face photo-attached official certificate. According to this, the verification of the user registration data against the data of a face photo-attached official certificate makes it possible to guarantee that the user registration data are data of the user him/herself. In addition, since the data of a face photo-attached official certificate used in the verification are not retained after the verification, it is possible to prevent leakage of the data of a face photo-attached official certificate. As a result, it is possible to guarantee that the user registration data are data of the user him/herself, while reducing the risk of leaking of user information.

Figure 12:
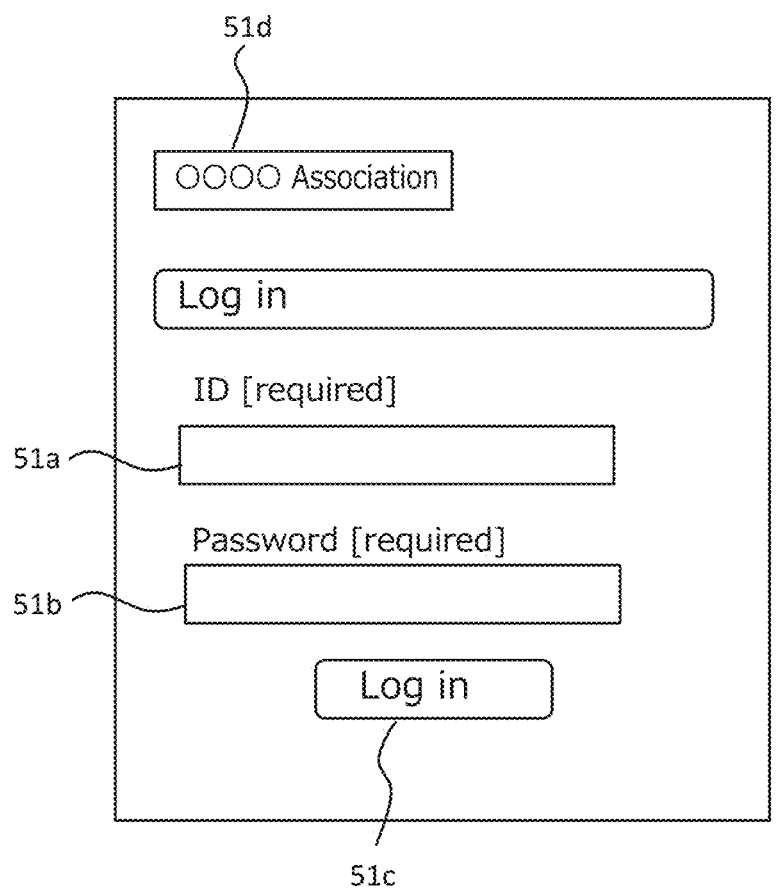
FIG. 12 is a schematic diagram illustrating an exemplary login screen displayed on a user terminal.

FIG. 12 shows an example of a login screen after the verification in the verification processing unit 25 is successful and the user registration data are registered in the registration data storage unit 21. As shown in FIG. 12, after being issued a login ID and password, the user can make access to the online learning system 100a by logging in from his/her own user terminal 301 to the distribution device 100.

Here, the learning of online lectures using the distribution device 100, and the identity verification and progress confirmation during a lecture are described. A user can log in the distribution device 100 by entering a login ID and a password given to him/her from the educational institution and using face authentication. The login IDs and passwords given to the students of the educational institution are stored in the registration data storage unit 21 of the educational institution server 201, while they are sent to the distribution device 100 from the educational institution server 201, and are stored in a memory that is accessible from the student management unit 13. Additionally, face photo data for authentication stored in the registration data storage unit 21 of the educational institution server 201, along with the login ID and password, are also sent to the distribution device 100 for identity verification during online learning, and are stored in a memory accessible from the student management unit 13.

As shown in FIG. 12, the URL of the login screen is notified from the educational institution to the student by means of a URL or a QR code (registered trademark). FIG. 12 is a schematic diagram illustrating an exemplary login screen displayed on the user terminal 301. As illustrated in FIG. 12, entry fields 51a and 51b for the login ID and the password are displayed on the login screen. When a user enters his/her login ID and password and touches a "Login" button 51c under the same, he/she thereby is allowed to use the online learning system 100a. Incidentally, at the top of the login screen, a logo 51d of the educational institution having issued the login ID and the password (the educational institution that the student attends) is displayed.

Figure 13:
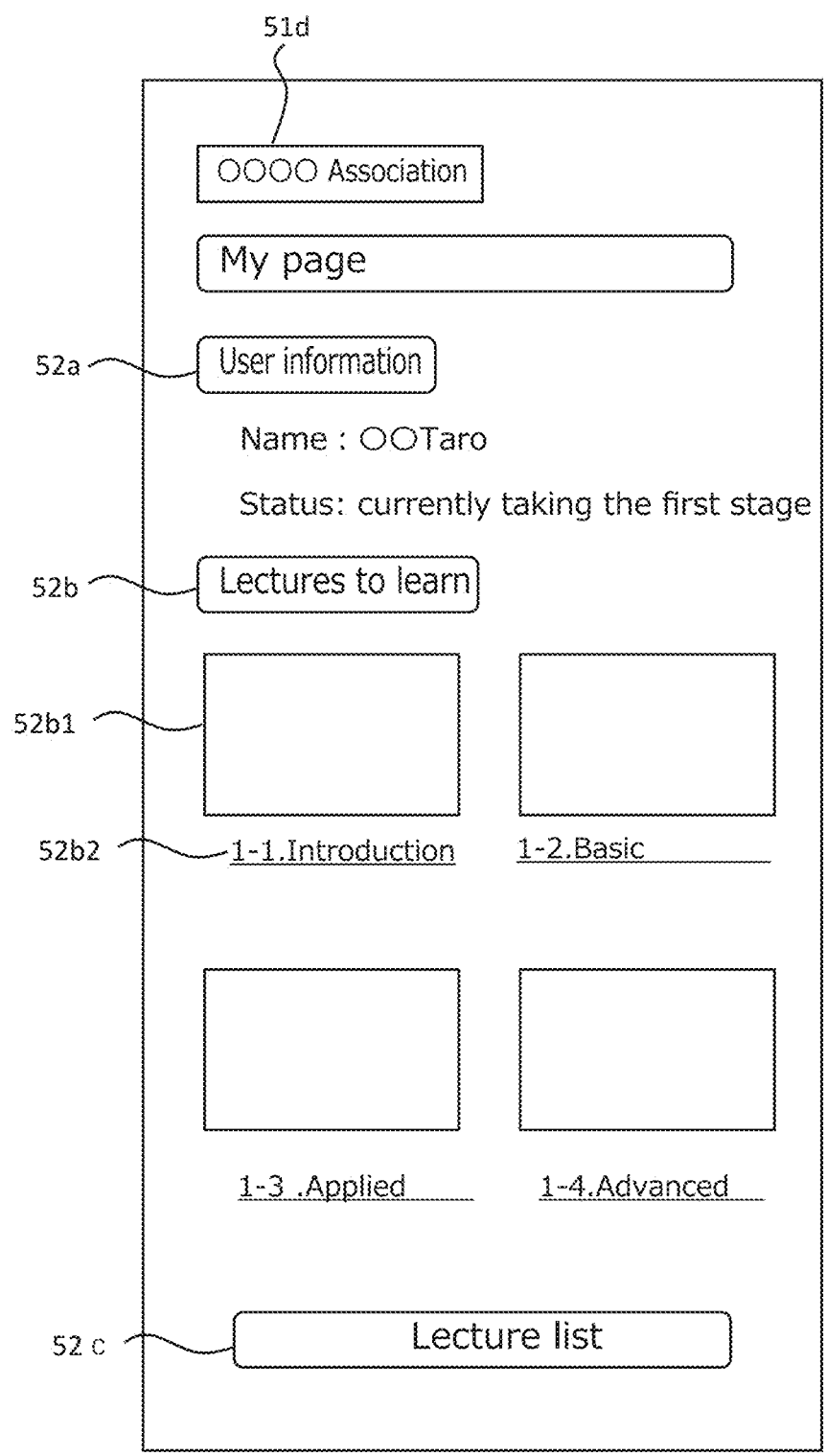
FIG. 13 is a schematic diagram illustrating an exemplary screen displayed on a user terminal after login.

FIG. 13 is a schematic diagram illustrating an exemplary "My Page" displayed on the user terminal 301 after the login. In the example shown in FIG. 13, user information 52a of the student including his/her name, status, etc. is displayed on the screen of the user terminal 301. In addition, items to be learned are displayed as lectures to learn 52b. In the example of FIG. 13, among the items of the first stage, some of lectures that have not yet been learned are displayed with titles 52b2 thereof and thumbnail images 52b1 presenting contents thereof. In a case where there are many lectures that have not yet been learned, only some of the same may be displayed on the screen, and a list of all the items of the first stage may be displayed in response to a touch on a lecture list button 52c (see FIG. 14). Incidentally, to a student who has not yet complete the first stage, only the lecture items of the first stage are displayed, so that he/she cannot select any lecture of the second stage. The titles 52b2 are hyperlinks, and when a student touches one of these, a request for distribution of the online learning material of the touched one is sent from the user terminal 301 to the distribution device 100.

Figure 14:
FIG. 14 is a schematic diagram illustrating one example of a list of items displayed on a user terminal.

As shown in FIG. 14, upon a touch on the lecture list button 52c, a list of all the items of the lectures of the first stage are displayed. On this list display, there are displayed item numbers 53a, titles 53b, learning progress 53c, and learning selection buttons 53d. Learned items are indicated with marks of "○" displayed in the fields of the learning progress 53c, whereas regarding unlearned items, marks of "x" and buttons of "Learn" are displayed in the fields. Incidentally, for a learned item, a button of "Re-learn" is displayed, and it is possible to learn the item again by touching the button. When a student selects the button of "Learn" or the button of "Re-learn", a request for distribution of the online learning material of the item thus selected is sent from the user terminal 301 to the distribution device 100.

Incidentally, as described above, the lecture of the item number 1-1, "Introduction" is supposed to be learned first in the first stage. Before a student learns the lecture of the item number 1-1, therefore, the button of "Learn" is displayed only for the item number 1-1, and the lecture selection button is not displayed for the other items.

In the distribution device 100, the communication unit 16 receives the request for distribution of the online learning material from the user terminal 301, and passes the same to the distribution control unit 15. The distribution request contains the student's login ID, and the item number of the online learning material requested to be distributed. The distribution control unit 15 inquires the student management unit 13, and confirms whether the login ID contained in the distribution request is a duly issued login ID. When the login ID is a duly issued login ID, the distribution control unit 15 extracts the online learning material of the requested item number from the lecture data storage unit 11, and distributes the same to the user terminal 301 via the communication unit 16 and the Internet 10.

Figure 15:
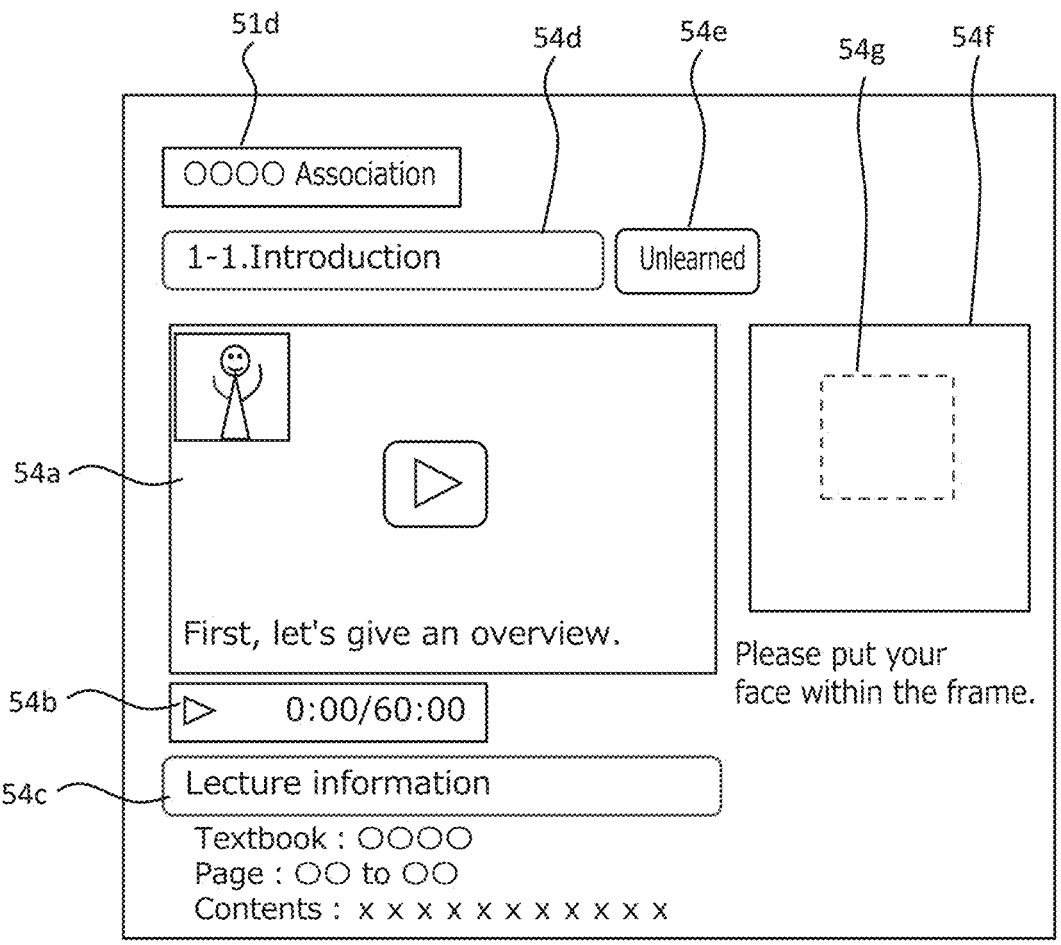
FIG. 15 is a schematic diagram illustrating an exemplary screen for an online learning material displayed on a user terminal (personal computer, etc.).

FIG. 15 illustrates an exemplary display screen for an online learning material (lecture video) distributed to the user terminal 301. Incidentally, FIG. 15 shows an exemplary display screen when the user terminal 301 has a relatively large display, such as a personal computer or a tablet. An exemplary online learning material display screen of a smartphone or the like, having a small display, is to be described later. As shown in FIG. 15, a display field 54d for displaying an item number and title of a lecture being distributed, as well as a learning status field 54e are displayed on the online learning material display screen. In the example shown in FIG. 15, as the student is learning "Introduction" of the item number 1-1 for the first time, "Unlearned" is displayed in the learning status field 54e. The online learning material (lecture video in FIG. 15) is displayed in a material display window 54a. In the example of FIG. 15, a sign language interpretation video is displayed in an upper left part of the material display window 54a. In addition, Japanese subtitles are displayed in a lower part of the material display window 54a. Displaying a sign language interpretation video and Japanese subtitles simultaneously with the lecture video allow students having auditory difficulties also to sufficiently understand contents of the lecture. Incidentally, the configuration may be such that the language of the subtitles can be selected from languages other than Japanese. Under the material display window 54*a*, an operation window 54*b* is displayed in which temporary stop or resumption of reproduction is controlled, and a current reproduction point is displayed. Further under the same, the title of a textbook used in the lecture, the page number to refer to, summary information of the lecture, etc. are displayed as lecture information 54*c*. Further, when image data of the material are distributed, the operation window 54*b* may have a display for controlling page forwarding and page returning. Further, when question and answer data are being distributed, the operation window 54*b* may have a display for controlling proceeding to the next question or returning to the previous question.

In addition, an authentication window 54*f* is displayed on the right side to the material display window 54*a*. In the authentication window 54*f*, an image photographed by a camera 33 built in the user terminal 301 is displayed as a motion picture, or as a still picture displayed frame by frame. The authentication window 54*f* indicates a range photographed by the camera 33. A recognition frame 54*g* is displayed in the authentication window 54*f*. The recognition frame 54*g* represents a region in an image that is taken by the camera 33 and is displayed in the authentication window 54*f*, the region being a target of matching with the face image (face photo data for authentication) registered in the distribution device 100. Therefore, as shown in FIG. 16, a student needs to work on the online learning materials, placing the image of his/her own face within the recognition frame 54*g*.

The authentication processing unit 14 samples (captures) an image in the recognition frame 54*g* at uniform time intervals, and matches the same with the student's face photo data for authentication. In a case where they are found to coincide with each other as a result of matching, the authentication processing unit 14 determines that the student him/herself work on the online learning material (watch the lecture in a case of lecture video), and sends information on the time when the matching was performed to the learning progress management unit 12. Based on the time information received from the authentication processing unit 14, the learning progress management unit 12 assumes that a part in the online learning material up to the point at which authentication can be given (from the start of video playback to the point where it is confirmed that the student has attended the lecture) is a learned part. In a case of the lecture video shown in FIG. 16, a part from the start of video playback to the point at which the attendance of the student himself/herself to the lecture can be confirmed is considered to be a learned part. In addition, in the case of the question and answer data (data of online drills, etc.) shown in FIG. 17, the questions up to which it is confirmed that the student himself/herself has worked are considered to be a learned part (answered questions). In addition, in a case where the authentication processing unit 14 performs matching every 10 seconds, the authentication processing unit 14 updates the point of the learned part in the online learning material every 10 seconds.

Figure 16:
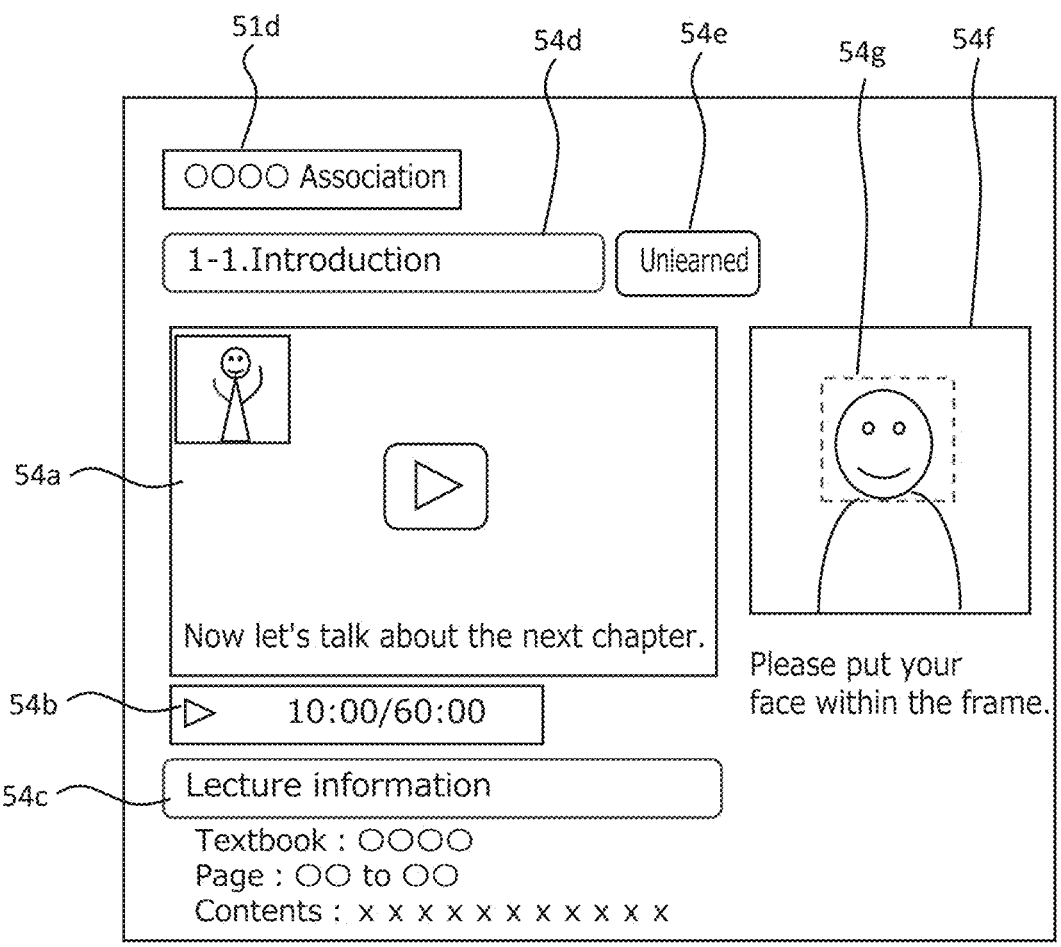
FIG. 16 is a schematic diagram illustrating an exemplary screen for an online learning material (lecture video), with a face of a student being arranged properly in a recognition frame.
Figure 17:
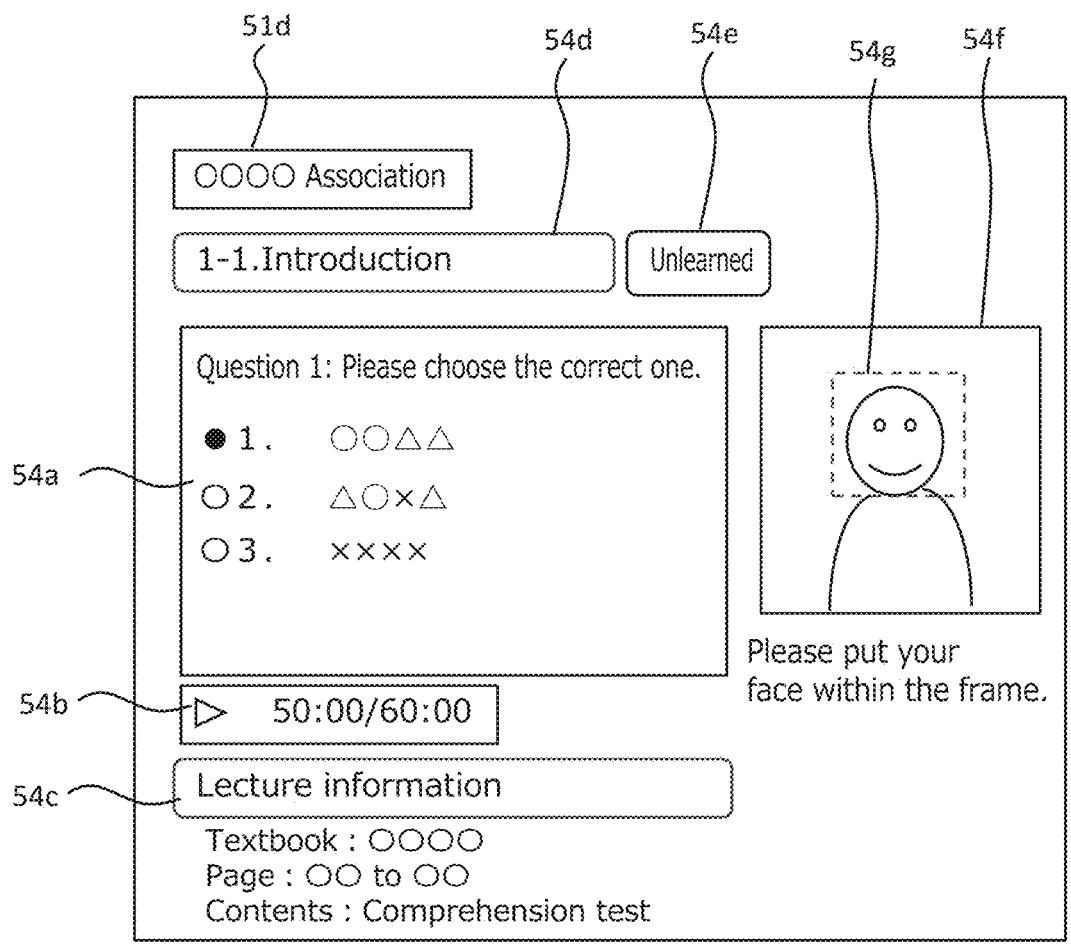
FIG. 17 is a schematic diagram illustrating an exemplary screen for an online learning material (question and answer data), with a face of a student being arranged properly in a recognition frame.
Figure 18:
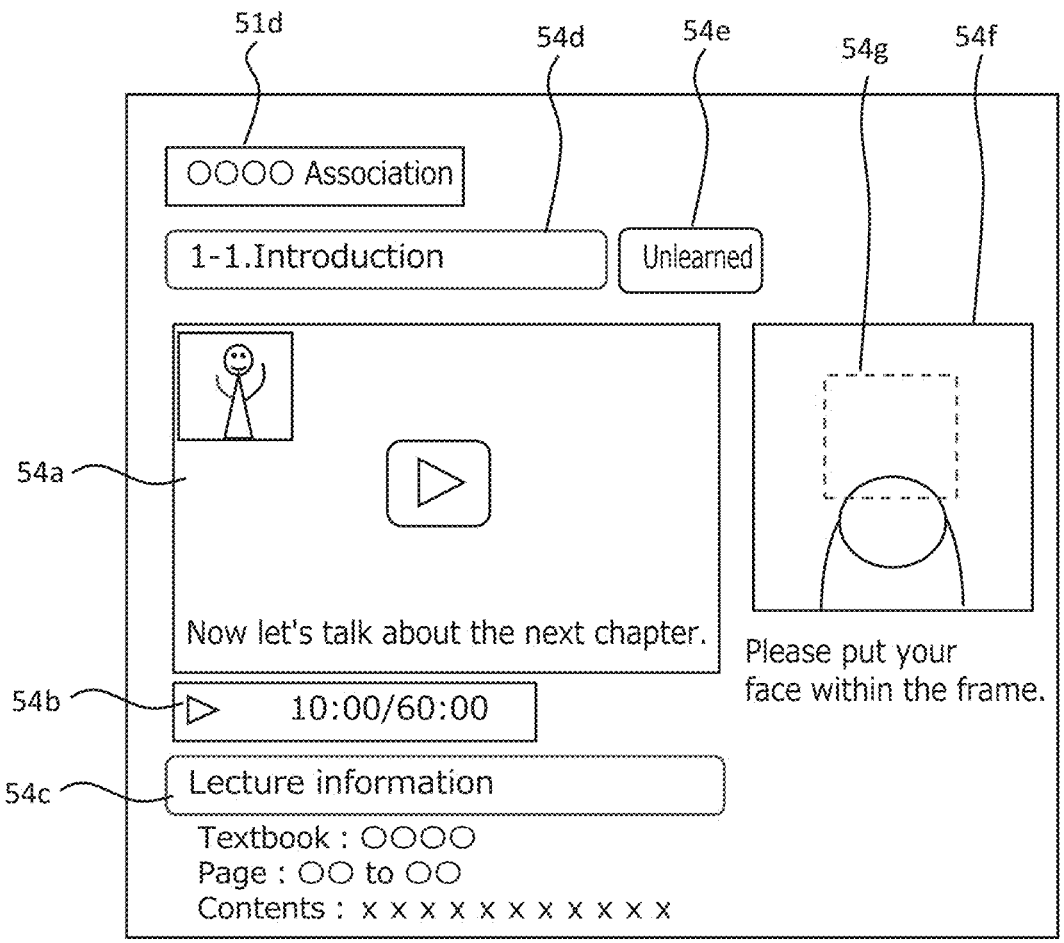
FIG. 18 is a schematic diagram illustrating an exemplary screen for an online learning material, with a face of a student not being arranged properly in a recognition frame.

In a case where the face part of the student him/herself is within the recognition frame 54*g* as shown in FIGS. 16 and 17, as a result of matching by the authentication processing unit 14, it is highly probably determined that the student him/herself attends the lecture. On the other hand, even if a face part of a person who is attending the lecture video is within the recognition frame 54*g* but the person is not the student him/herself, it is determined that the captured face image is different from the registered one, and the personal authentication highly probably fails. In addition, as shown in FIG. 18, even if the attending person is the student him/herself, when his/her face is not within the recognition frame 54*g* as a result of, for example, napping and lowering the head, the personal authentication fails, too. In addition, when the student is away from the seat, as his/her face is not within the recognition frame 54*g*, the personal authentication fails, too. When the personal authentication fails a predetermined times or more during attendance to a lecture of one item, or the personal authentication fails a predetermined times or more serially, the authentication processing unit 14 determines that the lecture is not properly attended. In such a case, even if the attendance continued to a midpoint or the end, the learning progress management unit 12 assumes the item of the attended lecture to be "Unlearned", and this item is required to be learned again from the start of the lecture. Incidentally, at a point of time when the personal authentication fails a predetermined times or more during attendance to a lecture of one item, or at a point of time when the personal authentication fails a predetermined times or more serially, the distribution control unit 15 may stop the distribution of this online learning material.

When a student concentratedly watch the lecture, it is relatively easy for the student to maintain such a posture that his/her face is within the recognition frame 54*g*. In addition, as the recognition frame 54*g* is displayed just beside the material display window 54*a*, it is not difficult for a student to confirm whether his/her face is within the recognition frame 54*g* while watching the material display window 54*a*. With the online learning system 100*a*, therefore, whether a person learning an online learning material is the student him/herself can be easily and surely determined. Even if a classroom lecture is learned on-line, this makes it possible to provide a learning environment at a level equal to that in a case where the lecture is learned in a classroom of an educational institution, and to guarantee the achievement degree. Furthermore, in the online learning system 100*a*, face authentication is performed in the background based on an image taken by the camera 33 provided on the user terminal 301 while the online learning materials are being distributed (displayed). With this configuration, the face authentication does not interfere with the work on the online learning material, and a student's concentration on the lecture is not impaired, as compared with the conventional system that requires a student to voluntarily and intentionally perform biometric authentication during a lecture.

In this way, there are no restrictions on when or where to learn a lecture, and students can learn on-line at their own convenience, which is extremely convenient for students. For example, lectures can be learned at any time in 24 hours, which is convenient for a student who goes to work or school in daytime or a student who wants to attend a lecture at a place with a time difference on an overseas business trip. In addition, an educational institution also has an advantage of, for example, avoiding securing a large space.

Incidentally, in the above-described example, the personal authentication is performed at uniform time intervals (for example, every 10 seconds), but the timing of personal authentication may be set at random. In this case, a student cannot predict a timing of personal authentication, and therefore it is possible to more surely prevent cheating such as spoofing.

Figure 19:
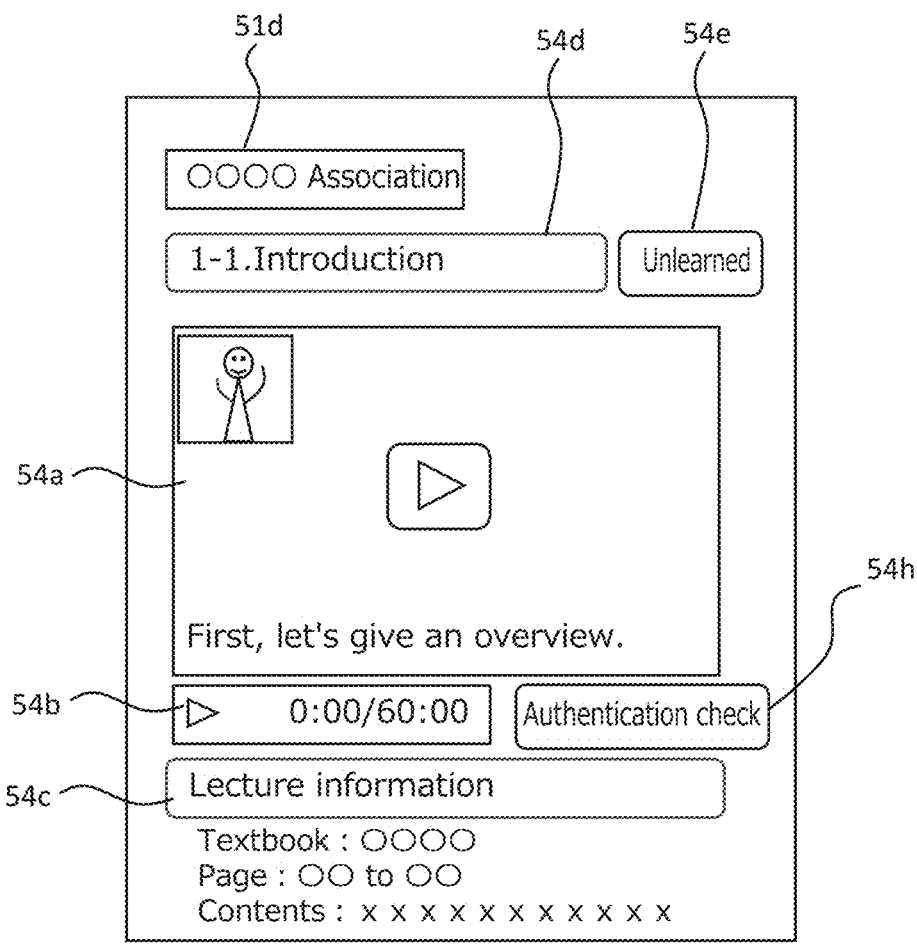
FIG. 19 is a schematic diagram illustrating an exemplary screen for an online learning material displayed on a user terminal (smartphone).

Here, an exemplary lecture video display screen in a case where the user terminal 301 has a relatively small display like a display of a smartphone is shown in FIG. 19. As is clear from comparison between FIG. 16 and FIG. 19, a lecture video display screen for a smartphone (FIG. 19) does not have an authentication window 54*f* displayed on a display of a personal computer or the like (see FIG. 16). Instead, an authentication check button 54*h* is displayed in the vicinity of the material display window 54*a* in the display screen of the smartphone, as shown in FIG. 19. Incidentally, even if the authentication window is not displayed on the screen, identity verification by face authentication is performed on background at uniform time intervals or at random timing during the display of the online learning material.

Figure 20:
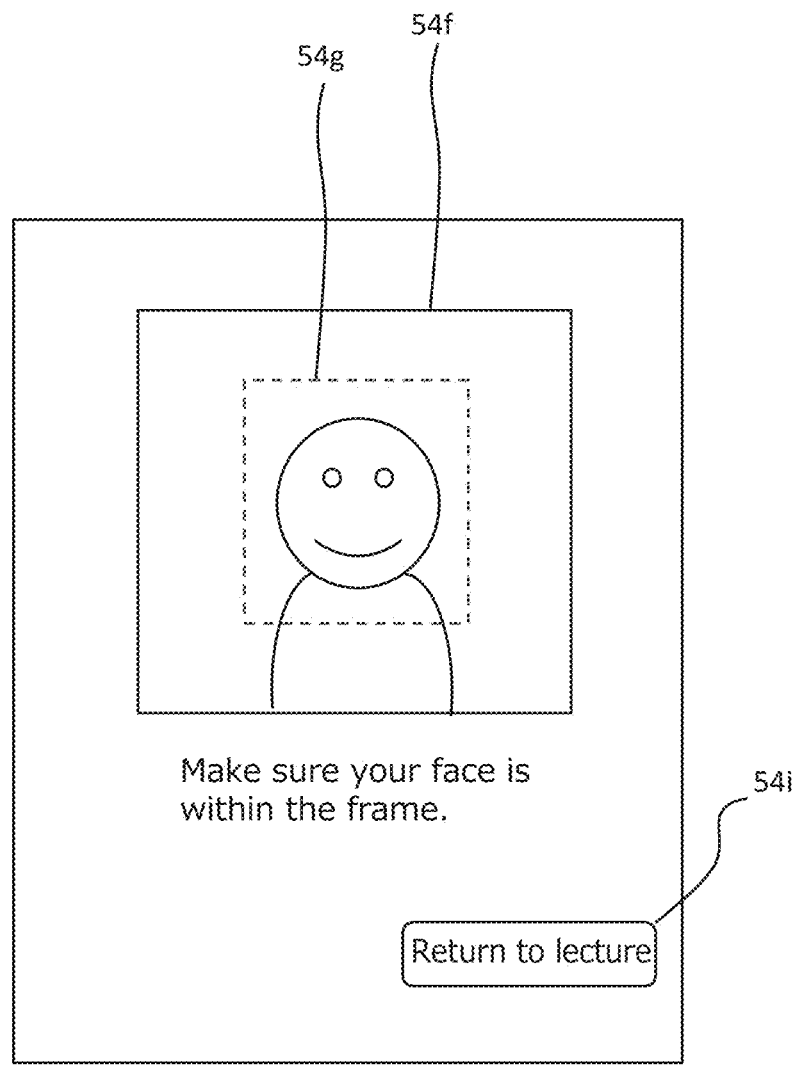
FIG. 20 is a schematic diagram illustrating an exemplary authentication window displayed on a user terminal (smartphone), with a face of a student being arranged properly in a recognition frame.
Figure 21:
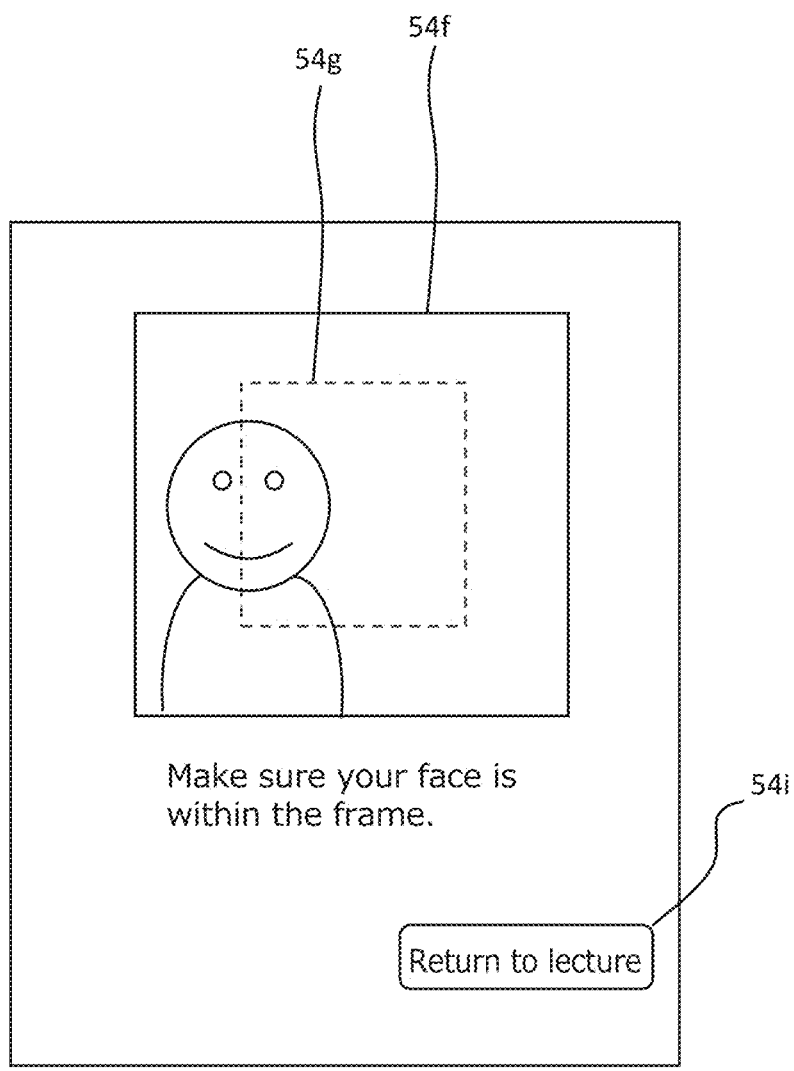
FIG. 21 is a schematic diagram illustrating an exemplary authentication window displayed on a user terminal (smartphone), with a face of a student not being arranged properly in a recognition frame.

A student operates the authentication check button 54*h* to confirm whether he/she is at such a position that the face authentication is appropriately performed, with respect to the user terminal 301. More specifically, when the student touches the authentication check button 54*h* at the start of a lecture or during a lecture, the display screen of the smartphone switches, and the authentication window 54*f* as shown in FIG. 20 is displayed. The recognition frame 54*g* is displayed in the authentication window 54*f*. Here, when the face is within the recognition frame 54*g* as shown in FIG. 20, identity verification is performed correctly during a lecture. On the other hand, when the face is not within the recognition frame 54*g* as shown in FIG. 21, identity verification is not performed correctly during a lecture. The student, therefore, adjusts the angle and position of the user terminal 301 while viewing this screen. When the face comes within the recognition frame 54*g*, a button 54*i*, "Return to lecture", is touched, whereby the screen returns to the display screen for the online learning material. Incidentally, in a case where a lecture video is reproduced, while the authentication window 54*f* shown in FIG. 21 is displayed, the reproduction of a lecture video is temporally stopped, so that the lecture should not proceed further.

Incidentally, the authentication window 54*f* is displayed upon a touch on the authentication check button 54*h*, in the example shown in FIG. 21. The configuration, however, may be such that by operating a temporary stop button displayed in the operation window 54*b*, in place of the authentication check button 54*h*, during the reproduction of a lecture video, the reproduction of a lecture video is temporally stopped and the authentication window 54*f* is displayed.

Alternatively, the configuration may be such that by swiping the screen of the smartphone, instead of operating the authentication check button 54*h*, the authentication window 54*f* is displayed.

Second Embodiment

Figure 22:
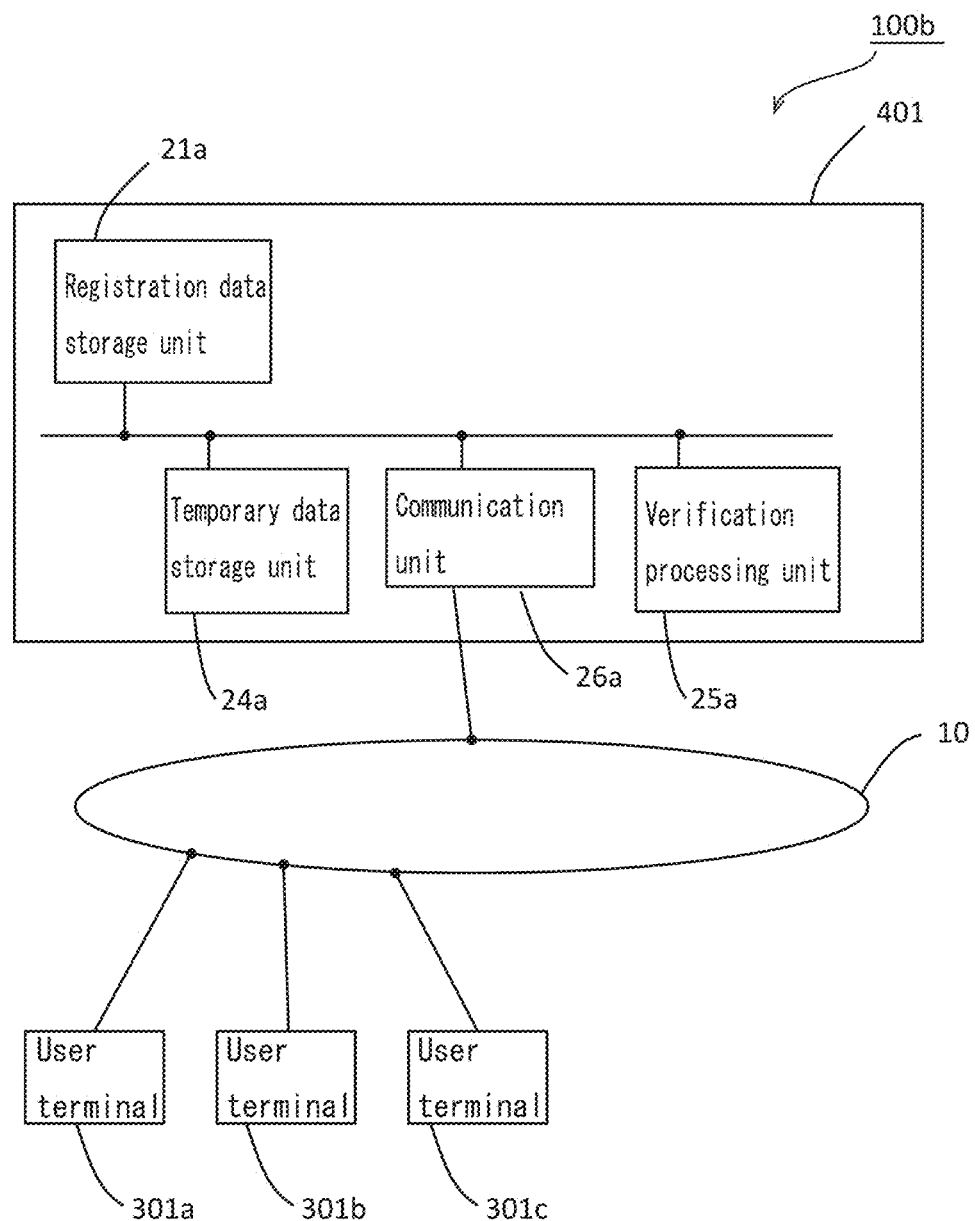
FIG. 22 is a block diagram illustrating a schematic configuration of an information management system according to a second embodiment.

Next, an information management system 100*b* according to the second embodiment is described with reference to FIGS. 22 and 23. Unlike the first embodiment, which was configured as an online learning system, the second embodiment is configured as an information management system 100*b* for managing user information. The constituent elements having the same configurations as those in the first embodiment are denoted by the same reference symbols, and descriptions of the same are omitted.

The information management system 100*b* according to the second embodiment is used, for example, to manage information of users who use services provided on-line. Services provided on-line include, but are not limited to, online shopping, matching services, transaction intermediation services, content distribution services, online medical services, reservation management services, and e-mail services. As shown in FIG. 22, the information management system 100*b* includes a server apparatus 401 that communicates with user terminals 301. The server apparatus 401 includes a registration data storage unit 21*a*, a temporary data storage unit 24*a*, a verification processing unit 25*a*, and a communication unit 26*a*.

User registration data such as a user's name, telephone number, login ID, password, address, and date of birth are entered by the user from the user terminal 301 and stored in the registration data storage unit 21*a*. Official certificate data are temporarily stored in the temporary data storage unit 24*a*. The foregoing official certificate data may be data of a face photo-attached official certificate similar to those of the first embodiment, or official certificate data without a face photo (for example, health insurance card) unlike the first embodiment.

Figure 23:
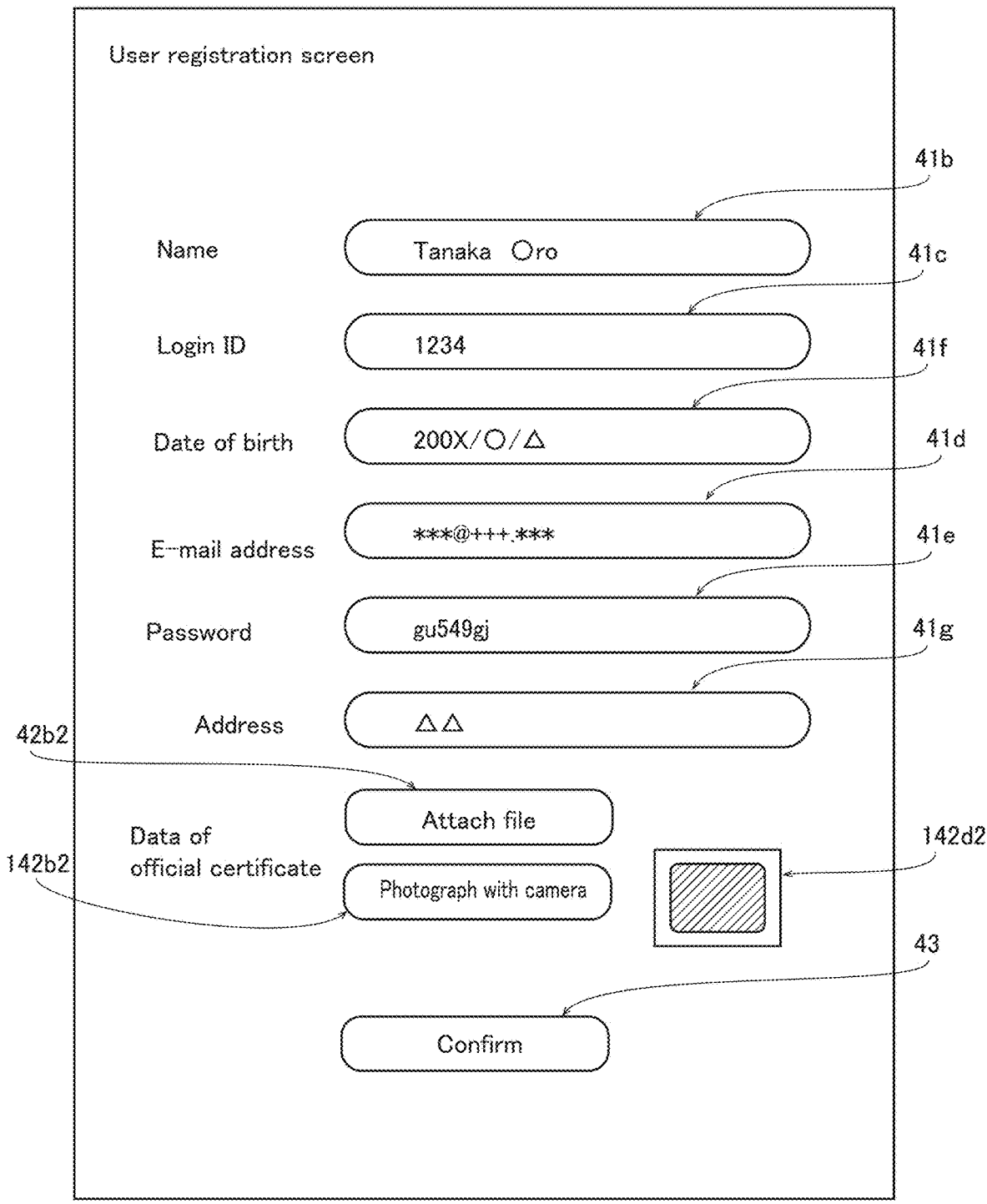
FIG. 23 is a schematic diagram illustrating an exemplary user registration screen.

FIG. 23 is a diagram showing an example of a user registration screen displayed on the user terminal 301 (any of the user terminals 301*a* to 301*c*). As shown in FIG. 23, on the user registration screen, entry fields 41*b* to 41*g*, a button 42*b*2 for uploading official certificate data, a confirmation button 43, and a button 142*b*2 are displayed. When the button 42*b*2 is operated, the official certificate data stored in the user terminal 301 are stored in the temporary data storage unit 24*a*. When the button 142*b*2 is operated, the camera 33 of the user terminal 301 is activated, and the screen shown in FIG. 8B is displayed. Then, when the official certificate is photographed as in the first embodiment, the photographed image is displayed on the image display section 142*d*2 on the user registration screen, as shown in FIG. 23.

The verification processing unit 25*a* extracts character data such as name, date of birth, and address from the official certificate data. Then, the verification processing unit 25*a* verifies the extracted character data against the information entered on the user registration screen. If the verification was successful, the verification processing unit 25*a* causes the user terminal 301 to display a screen notifying that the verification was successful, as shown in FIG. 9. Then, with an operation of the registration button 44, information entered on the user registration screen is registered in the registration data storage unit 21*a*. If the verification failed, the verification processing unit 25*a* causes the user terminal 301 to display a screen notifying that the verification failed, as shown in FIG. 10. After the verification, the temporary data storage unit 24*a* does not retain the official certificate data. For example, the temporary data storage unit 24*a* deletes the official certificate data, when the verification was successful. In addition, the temporary data storage unit 24*a* deletes the official certificate data when the communication with the user terminal 301 is disconnected (when the operation for registration is stopped). This makes it possible to, in the second embodiment as well, guarantee that registered user data belong to the user him/herself while reducing the risk of leaking of user information.

Modification Examples

Specific examples shown in conjunction with the first and second embodiments are merely examples, and are not intended to limit any embodiment of the present invention.

For example, in the first and second embodiments described above, an example is shown in which the temporary data storage unit deletes official certificate data after verification. However, in order to prevent the official certificate data from being retained in the temporary data storage unit, other than the above-described configuration of active individual deletion of the official certificate data, the configuration of the temporary data storage unit may be such that the temporary data storage unit overwrites the official certificate data with another official certificate data so that the official certificate data before overwriting are not retained. Alternatively, the configuration of the temporary data storage unit may be such that all of the stored contents are deleted at a predetermined timing.

Further, in the first embodiment, an example was shown in which the distribution device and the educational institution server are configured separately, but the distribution device and the educational institution server may be configured integrally.

In addition, in the first embodiment, an example is described in which the verification processing unit, in addition to verifying face photo data against data of a face photo-attached official certificate, also extracts character data from the data of a face photo-attached official certificate, and performs matching (verification) between user registration data entered on the student registration screen or lecturer registration screen and the extracted character data. The verification processing unit, however, may perform only verification of face photo data against data of the face photo-attached official certificate.

Also, in the first embodiment, the user terminal 301 has a built-in camera (in-camera) as the camera 33, but the camera for photographing a student during a lecture is not limited to the built-in camera. Instead, the camera may be an external camera that is connected to the user terminal 301 and used.

Furthermore, in the first embodiment, an example is described in which either of image data for authentication uploaded from the storage unit 35 of the user terminal 301 and the image data for authentication photographed by the camera 33 of the user terminal 301, are verified against data of a face photo-attached official certificate, but the configuration is not limited to this. For example, the configuration of the educational institution server 201 may be such that the image data for authentication uploaded from the storage unit 35 of the user terminal 301 are compared with verified against data of a face photo-attached official certificate, a face image photographed by the camera 33 is verified against the data of the face photo-attached official certificate, and then, only when both of the verifications are successful, the user registration data are permitted to be registered in the registration data storage unit 21.

The foregoing embodiments are described with reference to one example in which the distribution device 100 as an example of the present invention is implemented as one or a plurality of computers and peripheral devices thereof, i.e., as hardware. The present invention, however, may be implemented as a program that causes one or a plurality of computers to execute the functions of the distribution device 100, or as a recording medium that stores the program.

Incidentally, the present invention can be described as follows.

[First Configuration]

A server apparatus according to a first configuration includes:
 a registration data storage unit that stores user registration data corresponding to information written in an official certificate;
 a temporary data storage unit that temporarily stores official certificate data; and
 a verification processing unit that verifies the user registration data stored in the registration data storage unit against the official certificate data stored in the temporary data storage unit,
 wherein the temporary data storage unit does not retain the official certificate data used in the verification, after the verification in the verification processing unit.

With the first configuration, in which the user registration data are verified against the official certificate data, it is possible to guarantee that the user registration data belong to the user him/herself. The official certificate data used in the verification are not retained after the verification, which makes it possible to prevent leakage of the official certificate data. As a result, it is possible to guarantee that registered user data belong to the user him/herself while reducing the risk of leaking of user information.

[Second Configuration]

A server apparatus according to the second configuration has the first configuration further characterized in that:
 the user registration data include face photo data;
 the official certificate data include data of a face photo-attached certificate; and
 the verification processing unit performs verification of face photo data stored in the registration data storage unit against data of a face photo-attached official certificate stored in the temporary data storage unit.

According to the second configuration, even if the user registration data include face photo data, it is possible to guarantee that the face photo data belong to the user himself/herself, while reducing the risk of leakage of the user's information.

[Third Configuration]

An online learning system according to a third configuration includes: the server apparatus according to the second configuration;
 a distribution control unit that distributes an online learning material to a user terminal; and
 an authentication processing unit that performs face authentication of a user when the online learning material is to be distributed by the distribution control unit, based on an image photographed by the user terminal and face photo data stored in the registration data storage unit.

According to the third configuration, the user's face can be authenticated when an online learning material is to be distributed using face photo data that have been verified using the data of a face photo-attached official certificate, and this makes it possible to provide an online learning system that can guarantee that the person has taken online learning.

The invention disclosed herein can be implemented as a program executed by a processor of a computer that is accessible from a user terminal, or as a recording medium that records the program.

DESCRIPTION OF REFERENCE NUMERALS

100a: online learning system
100b: information management system
14: authentication processing unit
15: distribution control unit
16: communication unit
21, 21a: registration data storage unit
24, 24a: temporary data storage unit
25, 25a: verification processing unit
100: distribution device
201: educational institution server
301: user terminal
401: server apparatus

The invention claimed is:

1. An online learning system comprising:
a server apparatus comprising:
a first processor;
a temporary data storage; and
a registration data storage; and
a second processor; wherein
the first processor is configured or programmed to:
acquire, from a user terminal, data of a face photo-attached official certificate photographed by the user terminal, and cause the temporary data storage to temporarily store the same;
acquire face photo data to be stored in the registration data storage as user registration data that correspond to information written in an official certificate, the user registration data including face photo data from the user terminal;
acquire, from the user terminal, data of a user's face image photographed by the user terminal;
execute a first verification by comparing the acquired face photo data against the data of the face photo-attached official certificate stored in the temporary data storage;
execute a second verification by comparing the acquired user's face image against the data of the face photo-attached official certificate stored in the temporary data storage;
when both of the first verification and the second verification are successful, cause the temporary data storage not to retain the data of the face photo-attached official certificate used in the first verification and the second verification after the first verification and the second verification, and cause the registration data storage to register the user registration data including the face photo data used in the first verification;
perform identity verification based on the face photo data acquired from the user terminal and the user registration data including the face photo data used in the verification; and
cause the registration data storage to retain the user registration data including the face photo data used in the verification, continuously after the identity verification; and
the second processor is configured or programmed to perform face authentication of a user when an online learning material is to be distributed to the user terminal based on an image photographed by the user terminal and the face photo data stored in the registration data storage.

2. A non-transitory computer readable medium that stores a program that, in order to cause a user registration data storage to store user registration data corresponding to information written in an official certificate, causes a processor of a computer to execute:
a processing of, from a user terminal, acquiring data of a face photo-attached official certificate photographed by the user terminal, and causing a temporary data storage to temporarily store the same;
a first verification processing of, from the user terminal, acquiring face photo data to be stored as user registration data in a registration data storage, and executing a first verification by comparing the acquired face photo data against the data of the face photo-attached official certificate stored in the temporary data storage;
a second verification processing of, from the user terminal, acquiring data of a user's face image photographed by the user terminal, and executing a second verification by comparing the acquired user's face image against the data of the face photo-attached official certificate stored in the temporary data storage;
a data processing of, when both of the first verification and the second verification are successful, without retaining the data of the face photo-attached official certificate used in the first verification and the second verification in the temporary data storage, registering the user registration data including the face photo used in the first verification in the user registration data storage;
a processing of, performing identity verification based on the face photo data acquired from the user terminal and the user registration data including the face photo data used in the verification;
a processing of, causing the registration data storage to retain the user registration data including the face photo data used in the verification, continuously after the identity verification; and
a processing of, performing face authentication of a user when an online learning material is to be distributed to the user terminal based on an image photographed by the user terminal and the face photo data stored in the registration data storage.

3. A non-transitory computer-readable storage medium storing the program according to claim 2.

* * * * *